US012615673B2

(12) United States Patent
Stracke

(10) Patent No.: US 12,615,673 B2
(45) Date of Patent: Apr. 28, 2026

(54) SYSTEM AND METHOD FOR ATTEMPTING TO ESTABLISH A CONNECTION BETWEEN A MOBILE PHONE AND A VIRTUAL NODE OF A CELLULAR NETWORK

(71) Applicant: Rohde & Schwarz GmbH & Co. KG, Munich (DE)

(72) Inventor: Martin Stracke, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 217 days.

(21) Appl. No.: 18/054,245

(22) Filed: Nov. 10, 2022

(65) Prior Publication Data

US 2023/0199865 A1     Jun. 22, 2023

(30) Foreign Application Priority Data

Dec. 16, 2021     (EP) ..................................... 21215096

(51) Int. Cl.
*H04W 76/10*          (2018.01)
*H04W 8/18*           (2009.01)
*H04W 16/24*          (2009.01)

(52) U.S. Cl.
CPC ............. *H04W 76/10* (2018.02); *H04W 8/18* (2013.01); *H04W 16/24* (2013.01)

(58) Field of Classification Search
CPC ....... H04W 76/10; H04W 8/18; H04W 16/24; H04W 48/20; H04W 12/72; H04W 12/71
See application file for complete search history.

(56) References Cited

U.S. PATENT DOCUMENTS

| | | | |
|---|---|---|---|
| 8,750,123 B1 | 6/2014 | Alisawi | |
| 8,792,904 B2 * | 7/2014 | Nelkenbaum | ......... H04W 24/08 455/452.2 |
| 11,166,230 B1 * | 11/2021 | Chandra | ................. H04L 5/001 |
| 11,438,730 B1 * | 9/2022 | Soryal | ................... H04L 9/0894 |
| 2002/0173275 A1 * | 11/2002 | Coutant | ............... H04W 36/36 455/67.11 |
| 2008/0220749 A1 * | 9/2008 | Pridmore | ................. H04K 3/65 455/425 |
| 2009/0023424 A1 * | 1/2009 | Martin | .................... H04L 63/30 455/411 |

(Continued)

FOREIGN PATENT DOCUMENTS

| | | | | |
|---|---|---|---|---|
| EP | 1908319 A1 | 4/2008 | | |
| EP | 2661114 A1 * | 11/2013 | ............ | H04W 72/02 |

(Continued)

*Primary Examiner* — Kathy W Wang-Hurst
*Assistant Examiner* — Garth D Richmond
(74) *Attorney, Agent, or Firm* — CHRISTENSEN O'CONNOR JOHNSON KINDNESS PLLC

(57)          ABSTRACT

The present disclosure relates to a system for attempting to establish a connection between a mobile phone and a virtual node of a cellular network. The system includes the virtual node that is configured to be switchable such that the virtual node is switched off and on in a defined manner. The virtual node is configured to automatically change at least one cell parameter each time the virtual node is switched off and on. Further, the present disclosure relates to a method of attempting to establish a connection between a mobile phone and a virtual node of a cellular network.

16 Claims, 3 Drawing Sheets

(56)     References Cited

U.S. PATENT DOCUMENTS

| | | | |
|---|---|---|---|
| 2014/0134977 A1* | 5/2014 | Kemppainen ......... | H04W 24/06 |
| | | | 455/418 |
| 2014/0242948 A1* | 8/2014 | Glasberg .............. | H04L 63/302 |
| | | | 455/411 |
| 2016/0050521 A1* | 2/2016 | Glasberg ................ | H04W 4/14 |
| | | | 455/456.1 |
| 2018/0189141 A1* | 7/2018 | Friedman .................. | G06F 9/44 |
| 2020/0374685 A1 | 11/2020 | Goldfarb et al. | |
| 2021/0051751 A1* | 2/2021 | Pawar .................... | H04L 67/12 |
| 2023/0189050 A1* | 6/2023 | Rao ...................... | H04L 47/283 |
| | | | 370/231 |

FOREIGN PATENT DOCUMENTS

| | | | | | |
|---|---|---|---|---|---|
| WO | 2007/010223 | A1 | 1/2007 | | |
| WO | 2011/055129 | A1 | 5/2011 | | |
| WO | WO-2018014937 | A1 * | 1/2018 | ............. | H04L 63/14 |

* cited by examiner

- Prior art -

SYSTEM AND METHOD FOR ATTEMPTING TO ESTABLISH A CONNECTION BETWEEN A MOBILE PHONE AND A VIRTUAL NODE OF A CELLULAR NETWORK

TECHNICAL FIELD OF THE DISCLOSURE

Embodiments of the present disclosure relate to a system for attempting to establish a connection between a mobile phone and a virtual node of a cellular network. Further, embodiments of the present disclosure also relate to a method of attempting to establish a connection between a mobile phone and a virtual node of a cellular network.

BACKGROUND

In the state of the art, it is known that mobile phone monitoring systems, also called international mobile subscriber identity (IMSI) catchers, are provided, wherein the mobile phone monitoring systems are used to interrogate a mobile phone that tries to connect with a certain node of the cellular network.

The interrogation is inter alia done to identify the international mobile subscriber identity (IMSI) or the international mobile equipment identity (IMEI) of the respective mobile phone. The mobile phone monitoring systems also take specific cell configurations into account that are typically derived from a real network, e.g. by a network scanner. When interrogating the mobile phones, the mobile phone monitoring systems also obtain information of the mobile phone when trying to connect to a certain node of the cellular network, for example IMSI and/or IMEI of the mobile phone. Afterwards, the mobile phone which is interrogated by the IMSI catcher will be rejected by the IMSI catcher, namely after the identification of IMSI/IMEI. Then, respective information of the IMSI catcher is stored in a blacklist such that the mobile phone will not attempt to the IMSI catcher anymore. In some embodiments, previous rejections are typically stored in an internal blacklist of the mobile phone, for instance on the subscriber identity module (SIM) card of the mobile phone.

Generally, the mobile phone that has been rejected by a certain node will store at least one corresponding cell parameter of the rejecting node in the blacklist and, therefore, the mobile phone will not attempt to connect again to the respective blacklisted node within a certain time span that is defined on the network configuration or rather cell configuration. The duration can last from several minutes up to several hours. For instance, the mobile phone will not try to connect to the respective blacklisted node for the time span defined.

The respective blacklist is individually configured for different network providers in terms of how long the cell rejection will be upheld, e.g. how long the cell parameter associated with the rejecting node is stored in the blacklist.

Consequently, re-catching a mobile phone may be critical due to the blacklisting mentioned, which however impairs localization and/or identification use cases that might be of interest.

Accordingly, there is a need for an enhancement of catching performance in a cellular network.

SUMMARY

Embodiments of the present disclosure provide a system for attempting to establish a connection between a mobile phone and a virtual node of a cellular network. The system comprises the virtual node that is configured to be switchable such that the virtual node is switched off and on in a defined manner. The virtual node is configured to automatically change at least one cell parameter each time the virtual node is switched off and on.

Further, embodiments of the present disclosure provide a method of attempting to establish a connection between a mobile phone and a virtual node of a cellular network. The method comprises the steps of:

switching off and switching on a virtual node of the cellular network, and automatically changing at least one cell parameter of the virtual node when switching off and switching on the virtual node.

The main idea is that the blacklisting of the mobile phone can be overcome by changing at least one cell parameter of the virtual node, for example one of the important cell parameters, any time the respective virtual node is switched off and on, namely the virtual cell of the cellular network. In some embodiments, the value of the respective cell parameter is changed, thereby adapting the cell parameter. Therefore, it is possible that the catching performance is enhanced, especially re-catching the mobile phone, for instance for testing or even eavesdropping purposes like localization and identification use cases.

In some embodiments, the automatic change of the at least one cell parameter ensures that the corresponding virtual node appears as a physically different node and, therefore, the mobile phone will try to attach again to the respective virtual node even though it has been blacklisted before, but with a different entry for the respective cell parameter that has been changed when toggling the virtual node, resulting in the automatic change of the at least one cell parameter.

The virtual node of the cellular network may be switched off and on, namely toggled, in a periodic manner. The switching off and switching on may be typically done to attract the mobile phone to connect with the virtual node. For this purpose, the (virtual) node may be power-cycled such that the node appears and disappears in order to create the effect of at least one changing cell parameter.

The respective node may also be called cell.

Generally, the cellular network may comprise several nodes. Each of the nodes may be enabled to automatically change at least one cell parameter when the respective node is switched off and switched on.

An aspect provides that the system may comprise an International Mobile Subscriber Identity (IMSI) catcher that is configured to interrogate the mobile phone, thereby obtaining information of the mobile phone. In other words, an International Mobile Subscriber Identity (IMSI) catcher interrogates the mobile phone, thereby obtaining information of the mobile phone. The IMSI catcher is used to gather information like the international mobile subscriber identity (IMSI) or the international mobile equipment identity (IMEI) of the respective mobile phone.

In general, the IMSI catcher may be associated or even establish the virtual node.

A further aspect provides that the mobile phone to be interrogated is booked in before the International Mobile Subscriber Identity (IMSI) catcher interrogates the mobile phone. Therefore, the mobile phone is already connected with the virtual node before the IMSI catcher requests information concerning the IMSI and/or IMEI from the mobile phone.

The IMSI catcher may interrogate the mobile phone in order to obtain information concerning the IMSI/IMEI of the mobile phone.

Generally, the mobile phone would not connect again with the IMSI catcher or rather the virtual node associated with the IMSI catcher once it has been rejected for a certain time span defined. However, the respective cell parameter of the virtual node that has been blacklisted before will have changed automatically when the virtual node has been switched off and on so that the current cell parameter of the respective virtual node is different to the one provided in a blacklist of the mobile phone. Accordingly, re-catching of the mobile phone will take place such that the mobile phone is generally enabled to try to connect to the virtual node even though the respective SIM/network configuration, e.g. the respective time span for reconnection, would not allow such an attempt provided that the virtual node would not have changed its cell parameter.

This ensures that the mobile phone can be monitored continuously since the mobile phone can attempt to connect to the same virtual node several times even though it was rejected previously. Due to the switching off and switching on of the virtual node, namely the IMSI catcher, the mobile phone is indirectly prompted to continuously connect to the same virtual node irrespective of previous rejections.

According to another aspect, the automatic change of the at least one cell parameter is derived from information associated with the radio access technology (RAT) standard. The respective information used for automatically adapting or rather changing the at least one cell parameter may be obtained from the respective RAT standard defining the underlying physical connection method for a radio based communication network, e.g. GSM, UMTS, LTE, 5G, or 5G-NR. Due to the standard applied, the change of the at least one cell parameter may be done in a random manner, wherein information and/or boundaries defined by the respective standard are taken into account when changing the cell parameter.

Another aspect provides that the automatic change of the at least one cell parameter is derived from information associated with neighboring real cells of the cellular network. Therefore, the neighborhood of the cellular network is taken into account when adapting the at least one cell parameter in order to ensure better and faster changing of the respective cell parameter.

For instance, the system may comprise a scanner that is configured to scan the cellular network in order to obtain the information. In other words, the cellular network is scanned by a scanner in order to obtain the information. The respective scanner may relate to a network scanner. The scanner may interact with the real cells in the neighborhood so as to obtain the information from the real cells of the cellular network, thereby ensuring that the virtual node is adapted to the real node(s) in the cellular network. This improves the probability that the mobile phone will connect with the virtual node, thereby enabling the IMSI catcher to gather the information required, e.g. IMSI and/or IMEI of the mobile phone. Furthermore, the scanner may also obtain information that is associated with the radio access technology (RAT) standard so as to automatically change the at least one parameter of the virtual node accordingly.

Hence, the alternating values for the at least one cell parameter can be derived from the scanner, which may scan real network neighbor cells. Alternatively or additionally, the alternating values for the cell parameter can be randomized in line with the specification of the respective mobile standard.

Another aspect provides that the at least one cell parameter is a primary scrambling code (PSC), a physical cell ID (PCI), a location area code (LAC), an absolute radio-frequency channel number (ARFCN), an UTRA absolute radio-frequency channel number (UARFCN), or an E-UTRA absolute radio-frequency channel number (EARFCN). Depending on the respective configuration of the cellular network, namely GSM, UMTS, LTE, 5G, 5G-NR or even higher, the at least one cell parameter may be chosen accordingly.

For instance, the primary scrambling code (PSC) may be used for UMTS cellular networks, whereas the physical cell ID (PCI) may be used for LTE cellular networks. Further, location area code (LAC) may be used for GSM cellular networks.

Generally, the respective cell parameter is unique for a certain cell in a specific area so as to unambiguously identify the respective cell/node within the respective area of the cellular network.

According to another aspect, the step of switching off and switching on the virtual node occurs during a silent call. Thus, the re-starting of the virtual node does not influence an existing connection. A silent call may be prolonged by the step of switching off and switching on the virtual node, which is typically short in case no modification of the cell parameter would take place.

In general, the cellular network may be a 5G-NR ("5G New Radio") network or of even higher standard.

The IMSI catcher is a device that is typically used for intercepting mobile phone traffic and tracking location data of mobile phone users. The IMSI catcher masquerades as a base station, e.g. a virtual node, and causes every mobile phone within a defined radius to log in. With the help of a special identity request, it is able to force the transmission of the IMSI.

The system described above is generally configured to perform the method of attempting to establish a connection between a mobile phone and a virtual node of a cellular network.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
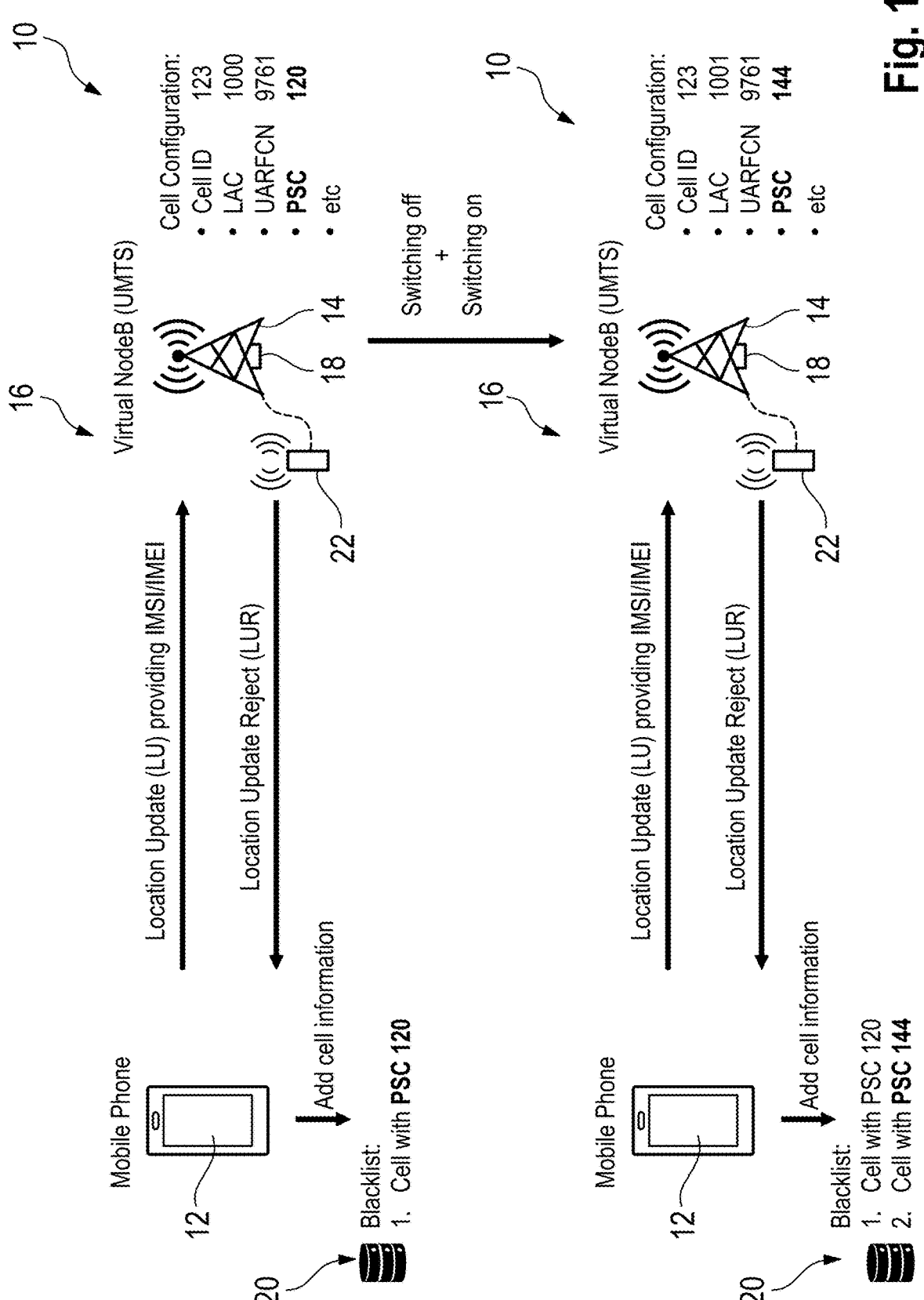
FIG. 1 schematically shows an overview of a system according to an embodiment of the present disclosure in a first state.

Turning now to FIG. 1, a system 10 for attempting to establish a connection between a mobile phone 12 and a virtual node 14 of a cellular network 16 is shown. The system 10 comprises the mobile phone 12 as well as the virtual node 14, which may be established as a virtual node B in a cellular network 16 according to the UMTS standard. Generally, the cellular network may also be established by a different standard like GSM, LTE, 5G, 5G-NR or even higher.

The virtual node 14 is configured to be switchable such that the virtual node 14 can be switched off and switched on in a defined manner, for instance periodically. For this purpose, the virtual node 14 may be power cycled in an appropriate manner.

FIG. 1 shows that the respective virtual node 14 can be defined by several cell parameters, which establish a unique cell configuration of the virtual node 14 within the cellular network 16. In the shown embodiment, the virtual node 14 may comprise several cell parameters such as a physical cell ID (PCI), a location area code (LAC), an UTRA absolute radio-frequency channel number (UARFCN), and a primary scrambling code (PSC).

Generally, the virtual node 14 is also enabled to automatically change at least one cell parameter each time the virtual node 14 is switched off and on, thereby appearing as a physically different node 14 within the cellular network 16 as will be explained later in more detail. In the shown embodiment, the PSC is the at least one cell parameter that automatically changes each time the virtual node 14 is toggled.

The system 10 may also comprise an International Mobile Subscriber Identity (IMSI) catcher 18 that is associated with the virtual node 14. In some embodiments, the IMSI catcher 18 and the virtual node 14 may be connected with each other, thereby sharing information among each other. For instance, the IMSI catcher 18 may control the virtual node 14, e.g. toggling the virtual node 14.

Generally, the IMSI catcher 18 and the virtual node 14 may be established by a common processor or a respective circuit. Put differently, the IMSI catcher 18 may masquerade as a base station, thereby establishing the virtual node 14. In other words, the virtual node 14 is provided by the IMSI catcher 18 that behaves like a cell/node within the cellular network 16, thereby establishing the virtual node 14 to which the mobile phone 12 tries to connect.

The IMSI catcher 18 interrogates the mobile phone 12 in order to obtain information associated with the mobile phone 12, namely the international mobile subscriber identity (IMSI) or the international mobile equipment identity (IMEI) of the mobile phone 12. For this purpose, the IMSI catcher 18 interrogates the mobile phone 12 such that the mobile phone 12 forwards location updates (LU) to the virtual node 14 to which the mobile phone 12 has booked before. The location updates (LU) provide the respective information concerning the international mobile subscriber identity (IMSI) and/or the international mobile equipment identity (IMEI) of the mobile phone 12 as shown in FIG. 1.

Hence, the virtual node 14 obtains the respective information about the mobile phone 12, which is forwarded to the IMSI catcher 18 such that the information is obtained by the IMSI catcher 18. Afterwards, the connection attempt is rejected by the virtual node 14, wherein the respective information, namely the rejection, is forwarded from the virtual node 14 to the mobile phone 12 by a location update reject (LUR). The mobile phone 12 processes the information obtained wherein cell information of the rejecting virtual node 14 is stored in an internal blacklist 20, e.g. on a SIM card of the mobile phone 12. Then, the virtual node 14 is switched off and switched on such that at least one cell parameter, e.g. the PSC, will change, namely its respective value.

The switching process, namely the toggling, may be initiated by the IMSI catcher 18 that controls the virtual node 14 accordingly. For instance, the switching off and switching on of the virtual node 14 takes place during a silent call such that the user of the mobile phone 12 will not be aware of the respective process.

As shown in FIG. 1, the respective value is changed from "120" to "144" automatically due to the toggling of the virtual node 14. Consequently, the virtual node 14 appears as another, namely different, node within the cellular network 16, which is not blacklisted. Hence, the "updated" node 14, namely the virtual node 14 with changed cell parameter, is not blacklisted by the mobile phone 12.

Therefore, the mobile phone 12 is enabled to re-catch with the virtual node 14 while attempting to establish a connection with the virtual node 14, namely the updated one. Again, the IMSI catcher 18 interrogates the mobile phone 12, which in turn forwards a location update (LU) with information concerning the IMSI/IMEI to the virtual node 14 that can be processed further, for example by the IMSI catcher 18. Usually, the attempt of the mobile phone 12 will be rejected again by the virtual node 14 as shown in FIG. 1 such that the mobile phone 12 will add the respective cell information to the blacklist 20, namely the updated cell parameter (PSC=144). Accordingly, the blacklist 20 of the mobile phone 12 will be enriched, but additional information is gathered due to the attempt of the mobile phone 12 to connect with the updated virtual node 14.

Generally, the information provided by the mobile phone 12 when trying to establish the connection with the virtual node 14 can be used for localization and/or identification use cases. Hence, the respective information may be useful even though the connection attempt will be rejected again. Put differently, the change of the cell parameter of the virtual node 14 generally allows the mobile phone 12 to try to connect to the virtual node 14, thereby forwarding information to the virtual node 14 that may be gathered by the IMSI catcher 18 for further processing.

Figure 3:
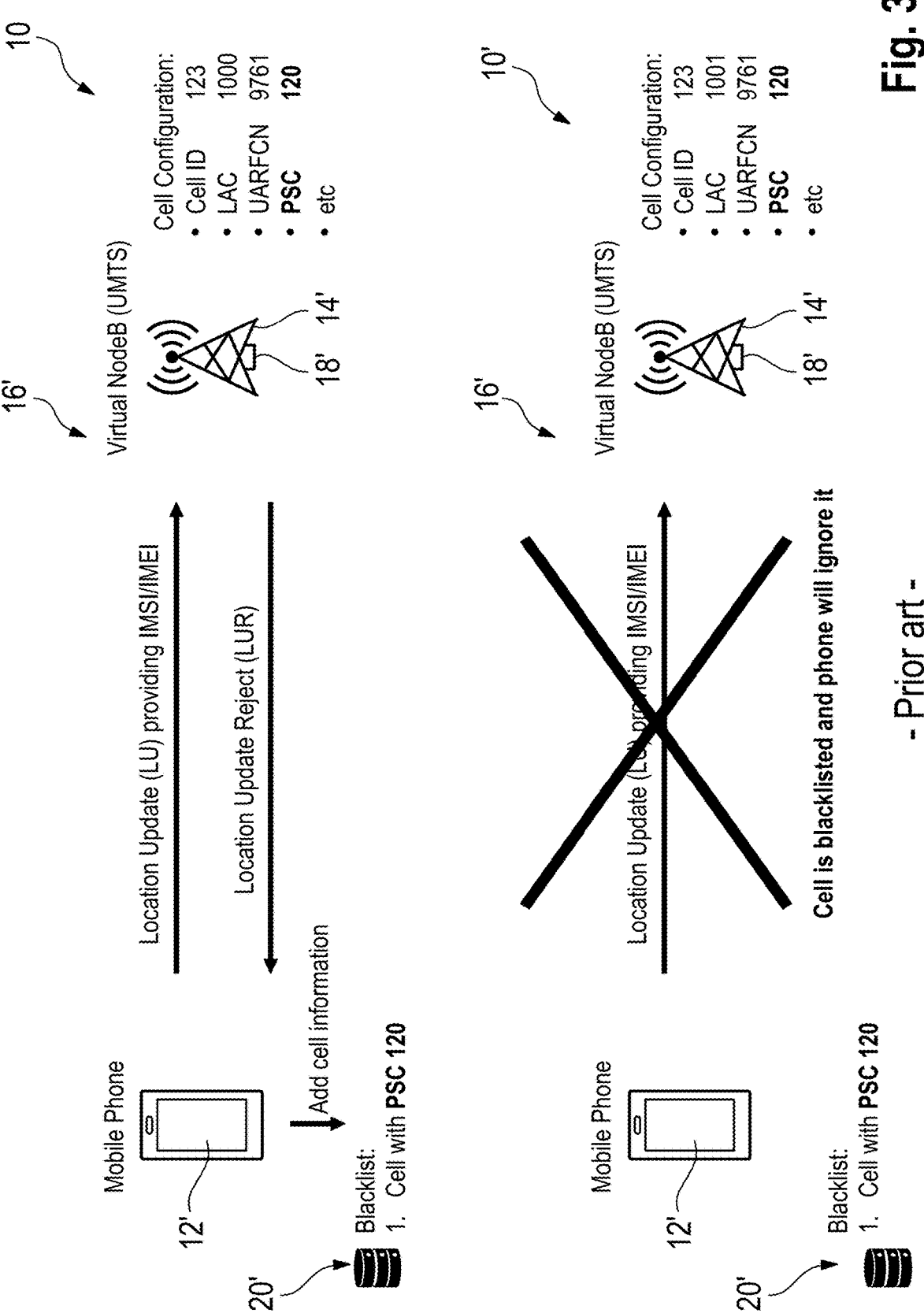
FIG. 3 schematically shows an overview of a system according to the prior art.

Contrary to this, the mobile phone 12' would not attempt to connect to the virtual node 14' as shown in the state of the art of FIG. 3 to which reference is made hereinafter. Since the cell parameters of the virtual node 14' remain the same in the state of the art, the virtual node 14' is blacklisted and, thus, the mobile phone 12' will ignore the respective virtual node 14'. Therefore, no interrogation is possible and no location update will be transmitted to the virtual node 14'. Consequently, no information is provided that could be used for localization and/or identification use cases.

Figure 2:
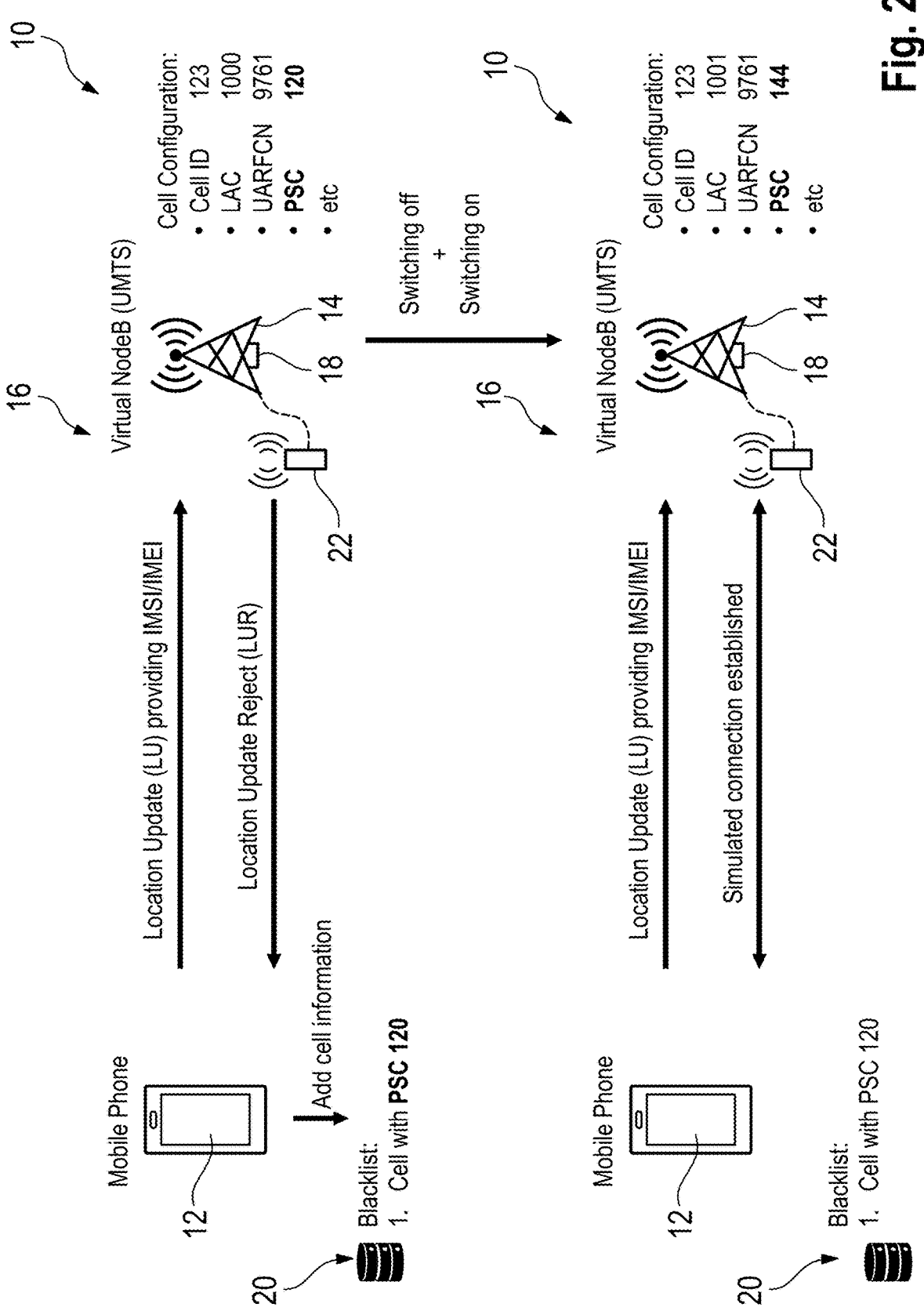
FIG. 2 schematically shows an overview of a system according to an embodiment of the present disclosure in a second state.

In FIG. 2, a different scenario is shown according to which a simulated connection will be established after changing the at least one cell parameter. As discussed above, the mobile phone 12 will attempt to establish the connection with the virtual node 14 after the virtual node 14 has switched off and switched on, thereby automatically changing its at least one cell parameter. Hence, the virtual node 14 may be appear as a different cell in the cellular network 16. Accordingly, it is generally possible that a simulated connection can be established which would not be possible in case of not changing the at least one cell parameter. The respective simulated connection may be used to gather further information from the mobile phone 12.

In general, the change of the at least one cell parameter may be derived from information associated with a radio access technology (RAT) standard used in the cellular network 16 and/or information associated with neighboring real cells of the cellular network 16. The respective information or at least part thereof may be obtained by a scanner 22, namely a network scanner. The scanner 22 scans the cellular network 16 in order to obtain the respective information that is used for changing the cell parameter of the virtual node 14, namely its respective value.

As shown in FIGS. 1 and 2, the at least one cell parameter may be a physical cell ID (PCI), a location area code (LAC), an UTRA absolute radio-frequency channel number (UARFCN) and/or a primary scrambling code (PSC). Further, an absolute radio-frequency channel number (ARFCN) and/or an E-UTRA absolute radio-frequency channel number (EARFCN) may also be used as the at least one cell parameter. Typically, this depends on the respective standard of the cellular network 16.

Generally, the system 10 as well as the associated method ensure that catching performance is enhanced, as re-catching of the mobile phone 12, namely catching multiple times, is improved significantly, which can be used for a localization and identification use cases.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein. Computer instructions may include but are not limited to applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably).

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Throughout this specification, terms of art may be used. These terms are to take on their ordinary meaning in the art from which they come, unless specifically defined herein or the context of their use would clearly suggest otherwise.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for enhancing the catching performance in a cellular network, the cellular network having one or more nodes, the system comprising:

a virtual node having one or more cell parameters, the virtual node configured to be switched off and then switched on in a defined manner, wherein the virtual node is configured to automatically change at least one cell parameter of the one or more cell parameters each time the virtual node is switched off and then switched on to cause the virtual node to appear as a physically different node in the cellular network each time the virtual node is switched off and then switched on due to the changed at least one cell parameter;

a mobile phone having a memory for storing a blacklist thereon, the mobile phone configured to attempt to establish connection with the virtual node as long as the virtual node does not appear on the blacklist, the mobile phone configured to transmit location information to the virtual node when attempting to establish connection with the virtual node;

an International Mobile Subscriber Identity catcher associated with the virtual node, the International Mobile Subscriber Identity catcher configured to interrogate the mobile phone, thereby obtaining the location information of the mobile phone, wherein the virtual node is configured to transmit a connection attempt reject signal to the mobile phone, the mobile phone placing the virtual node on the blacklist based on a value of the at least one cell parameter of the virtual node that is associated with the reject signal, and wherein once the value of at least one cell parameter of the virtual node is automatically changed to a new value via the virtual node being switched off and then switched on, the mobile phone is capable of attempting to establish connection to the virtual node having the new value of the at least one cell parameter so that the International Mobile Subscriber Identity catcher again interrogates the mobile phone and thereby obtains updated location information of the mobile phone.

2. The system according to claim 1, wherein the system comprises a scanner that is configured to scan the cellular network in order to obtain the information.

3. The system according to claim 1, wherein the at least one cell parameter is a primary scrambling code, a physical cell ID, a location area code, an absolute radio-frequency channel number, an UTRA absolute radio-frequency channel number, or an E-UTRA absolute radio-frequency channel number.

4. The system according to claim 1, wherein the automatic change of the at least one cell parameter of the one or more cell parameters is derived from information associated with at least one of a radio access technology standard or neighboring real cells of the cellular network.

5. The system according to claim 1, wherein the location information includes International Mobile Subscriber Identity (IMSI) data or International Mobile Equipment Identity (IMEI) data.

6. The system according to claim 1, wherein the cellular network includes a cell configuration that defines a time span for the rejected mobile phone to delay an attempt for reconnection to the virtual node after the virtual node is placed on the blacklist.

7. The system according to claim 6, wherein the mobile phone is configured to attempt reconnection to the virtual node during said time span as a result of the at least one cell parameter of the virtual node having automatically changed to the new value.

8. A method for enhancing the catching performance of a cellular network, the cellular network having one or more nodes, the method comprising:

interrogating a mobile phone by an International Mobile Subscriber Identity catcher that establishes a virtual node, thereby obtaining location information of the mobile phone, the mobile phone having a memory for storing a blacklist thereon;

transmitting a connection attempt reject signal to the mobile phone, the mobile phone placing the virtual node on the blacklist based on the at least one cell parameter of the virtual node that is associated with the reject signal;

switching off and then switching on the virtual node of the cellular network in a defined manner;

automatically changing at least one cell parameter of the virtual node when said virtual node is switched off and then switched on, wherein the virtual node appears as a physically different node after the virtual node is switched off and then switched on due to the changed at least one cell parameter, wherein the automatic change of the at least one cell parameter is derived from information associated with at least one of a radio access technology standard or neighboring real cells of the cellular network; and thereafter attempting, by the mobile phone, to connect to the virtual node having the changed at least one cell parameter so that the International Mobile Subscriber Identity catcher again interrogates the mobile phone and thereby obtains updated location information of the mobile phone.

9. The method according to claim 8, wherein the mobile phone to be interrogated is booked in before the International Mobile Subscriber Identity catcher interrogates the mobile phone.

10. The method according to claim 8, wherein the cellular network is scanned by a scanner in order to obtain the information.

11. The method according to claim 8, wherein the at least one cell parameter is a primary scrambling code, a physical cell ID, a location area code, an absolute radio-frequency channel number, an UTRA absolute radio-frequency channel number, or E-UTRA absolute radio-frequency channel number.

12. The method according to claim 8, wherein the cellular network is a 5G-NR network.

13. The method according to claim 8, wherein the location information includes International Mobile Subscriber Identity (IMSI) data or International Mobile Equipment Identity (IMEI) data.

14. The method according to claim 8, wherein said switching off and then switching on the virtual node occurs during a silent call.

15. The method according to claim 8, wherein the cellular network includes a cell configuration that defines a time span for the rejected mobile phone to delay an attempt for reconnection to the virtual node after the virtual node is placed on the blacklist.

16. The method according to claim 15, wherein said attempting, by the mobile phone, to connect to the virtual node having the changed at least one cell parameter occurs during said time span.

* * * * *